May 10, 1949.    W. W. MARTINMAAS, JR    2,469,510
ROTARY VANE ENGINE
Filed Oct. 7, 1946    2 Sheets-Sheet 2

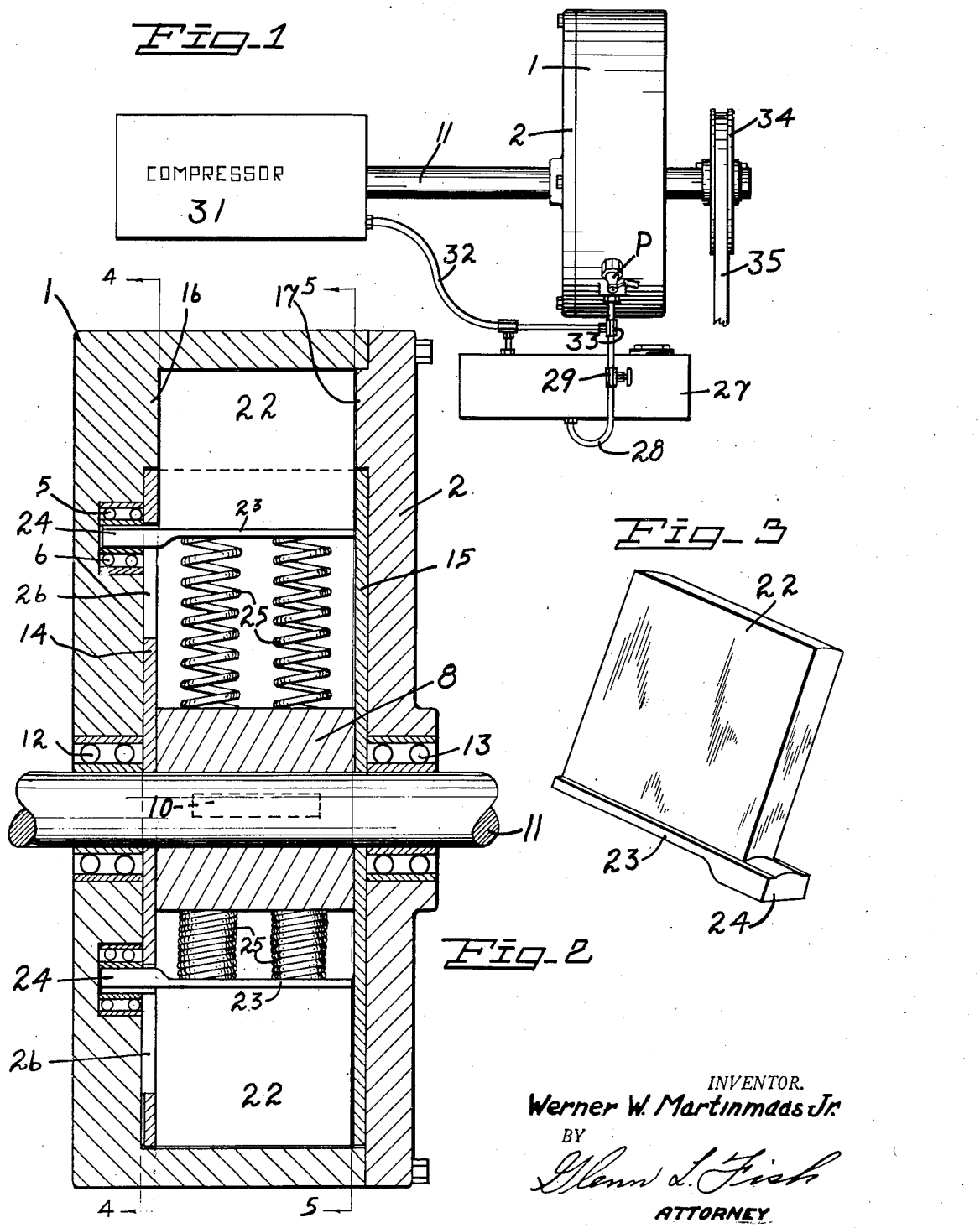

INVENTOR.
Werner W. Martinmaas Jr.
BY
ATTORNEY

Patented May 10, 1949

2,469,510

UNITED STATES PATENT OFFICE 2,469,510

ROTARY VANE ENGINE

Werner W. Martinmaas, Jr., Orient, S. Dak.

Application October 7, 1946, Serial No. 701,787

2 Claims. (Cl. 103—136)

My present invention relates to motors of the expansible chamber type, and more specifically to a rotary vane engine of the internal combustion class having an eccentric rotor with radically reciprocable vanes or pistons, and operated by fluid fuel under compression.

The primary object of the invention is the provision of a motor of this type that is composed of a minimum number of component parts that may with facility be manufactured at low cost of production, and assembled with convenience to provide a compactly arranged power plant from which power may be taken off and utilized for operating various appliances; and in some instances the parts may operate as a pump of the vacuum type when power is applied to the motor shaft.

The invention consists in certain novel combinations and arrangements of these component parts as will hereinafter be described and more specifically set forth in the appended claims.

In the accompanying drawings I have illustrated one complete example of the physical embodiment of my invention wherein the parts are combined and arranged in accord with one mode I have devised for the practical application of the principles of my invention. It will, however, be understood that changes and alterations may be made in these exemplifying drawings and mechanical structures, within the scope of my claims without departing from the principles of my invention.

Figure 1 is a view in elevation of a rotary engine embodying my invention, and including in its equipment an air compressor and fuel tank with fuel feeding mechanism, and indicating a belt drive for taking off power from the power plant.

Figure 2 is an enlarged detail vertical sectional view of the engine.

Figure 3 is a perspective view of one of the four vanes utilized within the expansible chamber of the engine cylinder.

Figure 4:
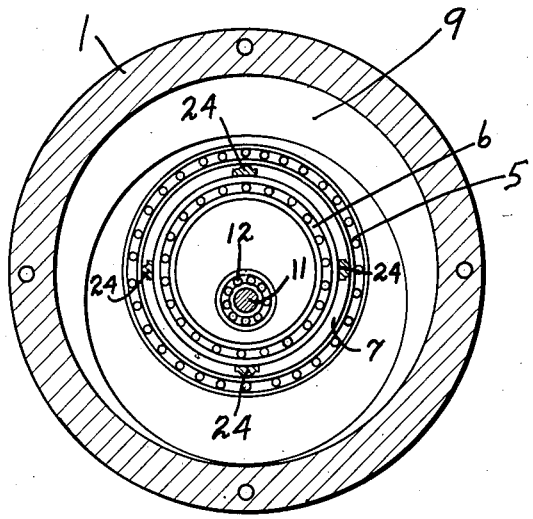
Figure 4 is a transverse vertical sectional view, on a reduced scale, at line 4—4 of Fig. 2.
Figure 5:
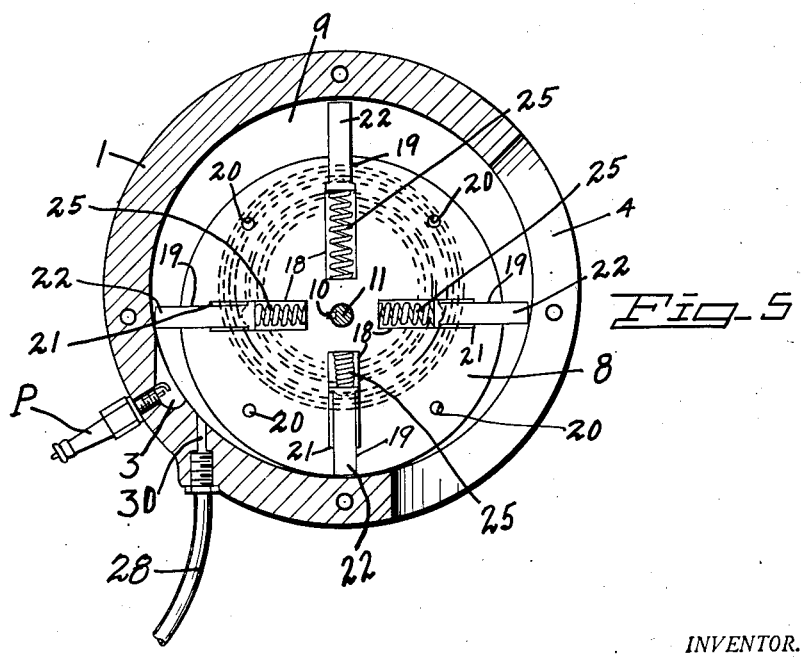
Figure 5 is a transverse vertical sectional view at line 5—5 of Fig. 2.

In carrying out my invention I employ a cylinder 1 having an open side or end that is closed by a circular cover plate 2, and the cylinder is mounted by conventional flanges to provide either a stationary power plant or a portable motor. In Fig. 5 the cylinder at its lower left side is provided with an intake port and combustion chamber 3 that is equipped with a spark plug P for ignition purposes, and which is included in an electrical ignition circuit; and at the opposite side of the cylinder an exhaust port 4 is provided for spent gases of combustion.

The inner face of the head forming a closed end of the cylinder is provided with two concentrically arranged ball bearing races 5 and 6 that are seated within an annular groove or recess in the face of the head, and these two races concentric with the center of the cylinder are spaced apart to form an annular track or runway 7 that is open to the interior of the cylinder.

Within the cylinder is eccentrically mounted a cylindrical rotor 8, in the shape of a disk that forms a crescent shaped expansible chamber 9 extending around the interior of the cylinder from the intake port to the exhaust port; and the rotor, which is keyed at 10 upon an eccentric shaft 11, revolves with the shaft that is journaled in bearings 12 and 13 mounted in the cylinder head and the cover plate respectively.

At its opposite sides the rotor is equipped with fixed comparatively thin guide plates or liners 14 and 15 that rotate with the rotor and seal the chamber against escape of fuel gases; and the portions of the cylinder and cover plate enclosing the crescent shaped expansible chamber are thickened, as at 16 and 17 respectively, for co-action with the liners for sealing the expansible chamber.

As best seen in Fig. 5 the rotor is provided with four radically extending slots, each of which includes an inner compartment 18, and an outer compartment 19 of less width than compartment 18 opening through the periphery of the rotor. The openings of these slots at the opposite sides of the rotor are closed by the liners 14 and 15 that are secured at the opposite sides of the rotor by countersunk screws threaded into holes 20 of the rotor; and the differential widths of the two compartments of a slot provide shoulders 21 between the two compartments.

The slots are adapted to receive and retain four radially reciprocable vanes, each indicated by the number 22, and these vanes, in the form of flat substantial plates of rectangular shape are each provided with an exterior retaining flange 23 and a projecting lug 24. Each vane is designed to reciprocate in the narrow compartment 19 of a slot and the flanged inner end of the vane is designed to reciprocate in the wider compartment 18 of a slot, with the shoulders 21 co-acting with the flange 23 to limit the outward movement of the vane.

While I have shown four vanes for the rotor, it will be understood that this number may be increased or diminished under varying conditions; and each of the vanes is provided with a pair of springs 25, tending at all times to constantly project or radially extend the vanes.

The vanes are projected and retracted as they revolve with the rotor through co-action of the lugs 24 of the vanes with the walls of the two ball bearing races that form the annular track 7 and through which track or runway the lugs travel.

To accommodate the reciprocating lugs 24 of the vanes the liner 14, as seen in Fig. 2, is slotted, as at 26, and the lug which projects through each slot is guided and retained within the annular track or runway 7.

Liquid fuel for combustion is supplied to the combustion chamber from a supply tank 27, through feed pipe 28 that is equipped with a control valve 29, to the inlet port 30, in Fig. 5, which port is tangentially arranged to direct the atomized fuel into the combustion area of the expansible chamber. For feeding the fuel under pressure, an air compressor and reservoir is indicated at 31 in Fig. 1 which supplies compressed air through pipe 32 to the fuel feed pipe 28 by way of the connection 33.

Power may be taken off the shaft 11 through a pulley 34 on the shaft and a belt drive including the belt 35, and applied to desired operating mechanism.

As indicated in Fig. 1 the shaft 11 extends to within the interior of the indicated compressor to provide power for operating the compressor, and if desired a pressure of compressed air may be built up within the fuel tank to atomize the liquid fuel as well as for supplying air for the fuel mixture in the combustion chamber.

The operation of the motor will be apparent from the disclosure in Fig. 5 where the rotor is turning clockwise and the power developed in the combustion chamber directed against the left hand vane moves the rotor, and succeeding charges of fuel impart movement to the partially projected vanes after they pass over the intake port. The spent gases of combustion are swept through the expansible chamber and out through the exhaust port 4 at the side of the cylinder opposite to the combustion chamber.

The principles of action embodied in the motor as disclosed may also be embodied in a fluid pump by applying power to the shaft 11 for revolving the rotor and its vanes, which by induction, as they pass over the inlet 30, may draw fluid from the pipe 28, and with the expansible chamber forming vacuum pockets between adjoining vanes, the fluid is passed around to the outlet or exhaust port 4 of the cylinder.

Having thus fully described my invention what I claim as new and desire to secure by Letters Patent is:

1. The combination in a rotary engine of the expansible chamber type with a cylinder having an inlet port and an exhaust port, a pair of annular ballbearing races mounted in the inner face of a head of the cylinder and spaced to form an annular runway, of a shaft eccentric to and journaled in the cylinder and a rotor having slots and carried by the shaft, a series of radially reciprocable vanes carried in the slots of the rotor, springs tending to project the vanes and means for limiting the projection of the vanes, and a laterally projecting lug on each vane traveling through and guided in said runway.

2. The combination in a rotary vane engine of the expansible chamber type with a ported cylinder having an interior annular guide groove in its head, a rotor having radial slots and shoulders adjacent the outer ends of the slots, a shaft for the rotor eccentrically journaled to form a crescent shaped chamber, and a pair of liner plates having slots and rigidly mounted at opposite sides of the rotor, of a series of radially reciprocable vanes mounted in the rotor between said plates and a spring for projecting each vane, stop flanges on the vanes coacting with the shoulders of the rotors, and guide lugs on the vanes projecting through slots of one of the liner plates.

WERNER W. MARTINMAAS, Jr.

REFERENCES CITED

The following references are of record in the file of this patent:

UNITED STATES PATENTS

| Number | Name | Date |
| --- | --- | --- |
| 732,671 | Andrews | June 30, 1903 |
| 1,350,775 | Brauer | Aug. 24, 1920 |
| 1,896,256 | Spencer | Feb. 7, 1933 |